(12) United States Patent
Loh et al.

(10) Patent No.: US 12,052,457 B2
(45) Date of Patent: Jul. 30, 2024

(54) CUSTOM ZONING FOR ADDRESSABLE TELEVISION ADVERTISEMENTS

(71) Applicant: GOOGLE LLC, Mountain View, CA (US)

(72) Inventors: Stella Loh, Mountain View, CA (US); Tyrone Nakahara, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/971,038

(22) PCT Filed: Jul. 31, 2018

(86) PCT No.: PCT/US2018/044628
§ 371 (c)(1),
(2) Date: Aug. 19, 2020

(87) PCT Pub. No.: WO2020/018126
PCT Pub. Date: Jan. 23, 2020

(65) Prior Publication Data
US 2021/0136437 A1 May 6, 2021

Related U.S. Application Data

(60) Provisional application No. 62/698,668, filed on Jul. 16, 2018.

(51) Int. Cl.
*H04N 21/262* (2011.01)
*H04N 21/25* (2011.01)
(Continued)

(52) U.S. Cl.
CPC ..... *H04N 21/26258* (2013.01); *H04N 21/252* (2013.01); *H04N 21/2668* (2013.01);
(Continued)

(58) Field of Classification Search
CPC .. H04N 21/47; H04N 21/482; H04N 21/4821; H04N 21/252; H04N 21/26258;
(Continued)

(56) References Cited

U.S. PATENT DOCUMENTS

2002/0067730 A1 6/2002 Hinderks et al.
2008/0310408 A1* 12/2008 Thompson .......... H04L 65/4076
370/386

(Continued)

FOREIGN PATENT DOCUMENTS

CN 101170637 A 4/2008
CN 101467449 A 6/2009
(Continued)

OTHER PUBLICATIONS

Examination Report for EP Appln. Ser. No. 18760092.9 dated Apr. 21, 2021 (5 pages).
(Continued)

*Primary Examiner* — Rong Le
(74) *Attorney, Agent, or Firm* — MARSHALL, GERSTEIN & BORUN LLP

(57) ABSTRACT

The present disclosure provides systems and methods for customized programming through "virtual zoning", not based on network architecture or geographic region, via a modified electronic programming guide (EPG) provided to devices assigned to virtual zones. Broadcasters may thus provide virtual zone-based "localized" programming to devices regardless of location. The virtual zone-based EPG may be functionally identical to conventional EPGs, and thus fully compatible with existing recipient devices, without requiring custom programming or manufacturer resources. Content may be broadcast to virtual zones via multicast IP streams, with primary content provided to a plurality of virtual zones and custom content provided on a
(Continued)

stream-by-stream basis. The resulting system is highly scalable, requiring additional resources only based on the number of virtual zones (which may be numbered in the tens or hundreds, in many implementations) rather than the number of recipient devices (which may be numbered in the millions).

18 Claims, 5 Drawing Sheets

(51) Int. Cl.
*H04N 21/2668* (2011.01)
*H04N 21/6405* (2011.01)
*H04N 21/81* (2011.01)
*H04N 21/845* (2011.01)

(52) U.S. Cl.
CPC ....... *H04N 21/6405* (2013.01); *H04N 21/812* (2013.01); *H04N 21/8456* (2013.01)

(58) Field of Classification Search
CPC ........... H04N 21/2668; H04N 21/6405; H04N 21/812; H04N 21/8456
See application file for complete search history.

(56) References Cited

U.S. PATENT DOCUMENTS

| | | | |
|---|---|---|---|
| 2009/0187941 | A1 | 7/2009 | Smith |
| 2010/0238924 | A1 | 9/2010 | Liu |
| 2011/0030003 | A1* | 2/2011 | Schmidt ............. H04N 21/4622 725/32 |
| 2012/0047542 | A1 | 2/2012 | Lewis et al. |
| 2012/0311635 | A1* | 12/2012 | Mushkatblat .... H04N 21/44222 725/43 |
| 2015/0271541 | A1 | 9/2015 | Gonder et al. |
| 2016/0037215 | A1* | 2/2016 | Cardona ........ H04N 21/234309 725/31 |

FOREIGN PATENT DOCUMENTS

| | | |
|---|---|---|
| EP | 1 871 104 A1 | 12/2007 |
| JP | 2011-515923 A | 5/2011 |
| WO | WO-2010/034459 A1 | 4/2010 |

OTHER PUBLICATIONS

International Preliminary Report on Patentability, Ch. I, for PCT Appln. Ser. No. PCT/US2018/044628 dated Jan. 28, 2021 (11 pages).
International Search Report re PCT/US2018/044628 dated Jun. 11, 2018.
Written Opinion of the International Searching Authority re PCT/US2018/044628 dated Jan. 23, 2020.
Notice of Reasons for Rejection for Japanese Application No. 2020-545292, dated Nov. 22, 2021.
First Examination Report for India Application No. 202027035361, dated Aug. 26, 2021.
First Office Action for Chinese Application No. 201880090576.8, dated Sep. 8, 2021.
Notice of Reasons for Rejection for Japanese Application No. 2020-545292, dated Jul. 11, 2022.
Office Action for European Patent Application No. 18760092.9, dated Jun. 7, 2023.
Office Action for Korean Application No. 10-2020-7025485, dated Apr. 18, 2022.
Office Action for Korean Application No. 10-2020-7025485, dated Dec. 21, 2021.
Notice of Allowance for Chinese Application No. 201880090576.8, dated Jun. 8, 2022.
Notice of Allowance for Korean Application No. 10-2020-7025485, dated Aug. 2, 2022.
Summons for Oral Proceedings for European Patent Application No. 18760092.9, dated Dec. 23, 2022.

* cited by examiner

CUSTOM ZONING FOR ADDRESSABLE TELEVISION ADVERTISEMENTS

CROSS-REFERENCE TO RELATED APPLICATIONS

The present application is a National Stage Application, filed under 35 U.S.C. 371, of International Patent Application No. PCT/US18/044628 filed on Jul. 31, 2018 titled "CUSTOM ZONING FOR ADDRESSABLE TELEVISION ADVERTISEMENTS," which in turn claims priority to U.S. Ser. No. 62/698,668 filed Jul. 16, 2018 titled "CUSTOM ZONING FOR ADDRESSABLE TELEVISION ADVERTISEMENTS," the entireties of which are incorporated by reference herein.

BACKGROUND

Conventional television distribution, whether over-the-air broadcast, satellite broadcast, or cable broadcast, is typically based on geographic regions, with recipient devices (e.g. televisions, set top boxes, etc.) in the same geographic region receiving the same content. This content may include primary programming as well as localized content, such as local news, weather, traffic, advertising, promotions, etc. The physical topology of the distribution system—whether terrestrial broadcast to a region or cable broadcast through local nodes and taps to individual residences or businesses—may limit the ability of broadcasters to provide individualized programming. Even with internet protocol-based television distribution (commonly referred to as IPTV), the same media, including localized content, is provided to recipient devices based on geographic regions.

Some attempts to provide individualized programming require modifications to recipient devices, such as custom programming for televisions or set top boxes. For example, in some implementations, a set top box may include a customized client agent that receives a network stream for primary programming (e.g. via multicast IP distribution), and then retrieves additional programming via unicast IP from a content server for playback. While these systems may allow for individualized programming, they lack scalability (e.g. each client requires its own communication session with the content server, which may quickly become impractical with geographic regions including tens or hundreds of thousands of recipient devices, or even millions for major metropolitan areas). Additionally, each recipient device must be programmed with the client agent, requiring cooperation from large numbers of device manufacturers, including television manufacturers, set top box manufacturers, cable or satellite modem manufacturers, etc., with significant development resources required for design, implementation, testing, and support. This may also adversely impact product development cycles, as manufacturers who develop new smart televisions each year may not wish to devote resources to a product with a limited release time.

SUMMARY

The systems and methods discussed herein provide for customized programming through "virtual zoning", not based on network architecture or geographic region, via a modified electronic programming guide (EPG) provided to devices assigned to virtual zones. Broadcasters may thus provide virtual zone-based "localized" programming to devices regardless of location. The virtual zone-based EPG may be functionally identical to conventional EPGs, and thus fully compatible with existing recipient devices, without requiring custom programming or manufacturer resources. Content may be broadcast to virtual zones via multicast IP streams, with primary content provided to a plurality of virtual zones and custom content provided on a stream-by-stream basis. The resulting system is highly scalable, requiring additional resources only based on the number of virtual zones (which may be numbered in the tens or hundreds, in many implementations) rather than the number of recipient devices (which may be numbered in the millions).

In an aspect described herein there is provided a method for multicast media delivery to virtual zones. The method comprises receiving, by an electronic program guide (EPG) server, a plurality of requests for an EPG from a corresponding plurality of client devices, identifying, by the EPG server, a first subset of the plurality of client devices as corresponding to a first virtual zone, the first virtual zone associated with a first characteristic, and a second subset of the plurality of client devices as corresponding to a second virtual zone, the second virtual zone associated with a second characteristic, generating, by the EPG server, a first EPG corresponding to the first virtual zone comprising an identification of a first media stream and a first multicast address, generating, by the EPG server, a second EPG corresponding to the second virtual zone comprising an identification of the first media stream and a second multicast address, and providing, by the EPG server, the first EPG to the first subset of the plurality of devices and the second EPG to the second subset of the plurality of devices.

For example, the first virtual zone may be associated with a first policy, the first policy comprising the first characteristic. The second virtual zone may be associated with a second policy, the second policy comprising the second characteristic. Each of the policies may comprise a plurality of characteristics. Each of the characteristics may comprise a set of predetermined values for the one or more characteristics.

The subject matter of the present disclosure addresses technical problems associated with the provision of content over a network to different client devices having different characteristics. For example, the characteristics may relate to a bandwidth requirements, location, device type, viewing history, or any other user or device type characteristic. For example, users having a particular client device type capable of receiving a first particular type of data may be associated with the first virtual zone, and users having a particular client device type capable of receiving a second particular type of data may be associated with the second virtual zone. In another example, client devices capable of streaming at a high bandwidth may be associated with a first virtual zone, and client devices who are only capable of streaming at a lower bandwidth may be associated with a second virtual zone. Identifying subsets of client devices as corresponding to virtual zones allows appropriate EPGs to be provided to the client devices based on, for example, capabilities of the client devices.

Identifying the first subset of the plurality of client devices as corresponding to the first virtual zone may further comprise, for each client device of the first subset, receiving a device identifier of said client device, retrieving a profile corresponding to the received device identifier, the profile associated with a third characteristic, identifying a match between the third characteristic associated with the retrieved profile and the first characteristic associated with the first virtual zone, and responsive to identifying the match, adding said client device to the first virtual zone.

Identifying the second subset of the plurality of client devices as corresponding to the second virtual zone may further comprise, for each client device of the second subset, receiving a device identifier of said client device, retrieving a profile corresponding to the received device identifier, the profile associated with a fourth characteristic, identifying a match between the fourth characteristic associated with the retrieved profile and the second characteristic associated with the second virtual zone, and responsive to identifying the match, adding said client device to the second virtual zone.

For example, the first characteristic may comprise a first predetermined value and the third characteristic may comprise a second predetermined value.

The profiles corresponding to the received device identifiers may comprise a plurality of characteristics.

The first virtual zone may be associated with a first policy, the first policy comprising the first characteristic, and the second virtual zone is associated with a second policy, the second policy comprising the second characteristic. Each of the policies may comprise a number of characteristics.

A first client device of the first subset and a second client device of the second subset may be within a same geographic region.

Generating the first EPG may further comprise generating a stream manifest for the first media stream comprising an identification of a first item of inserted content.

Generating the second EPG may further comprise generating a stream manifest for the second media stream comprising an identification of a second, different item of inserted content.

A first device of the first subset of the plurality of devices may receive the first media stream via the first multicast address, and a second device of the second subset of the plurality of devices may receive the first media stream via the second multicast address.

In a second aspect described herein there is provided a system for multicast media delivery to virtual zones. The system comprises an electronic program guide (EPG) server in communication with a plurality of client devices configured to receive a request for an EPG from each of the plurality of client devices, identify a first subset of the plurality of client devices as corresponding to a first virtual zone, the first virtual zone associated with a first characteristic, and a second subset of the plurality of client devices as corresponding to a second virtual zone, the second virtual zone associated with a second characteristic, generate a first EPG corresponding to the first virtual zone comprising an identification of a first media stream and a first multicast address, generate a second EPG corresponding to the second virtual zone comprising an identification of the first media stream and a second multicast address, and provide the first EPG to the first subset of the plurality of devices and the second EPG to the second subset of the plurality of devices.

In a third aspect described herein there is provided a method for multicast media delivery to virtual zones. The method comprises receiving, from an electronic program guide (EPG) server by a streaming server, an identification of a first media stream, a first multicast address, and a second multicast address, receiving, by the streaming server, a plurality of chunks of the first media stream, generating a first substream comprising a subset of the plurality of chunks of the first media stream and a first one or more additional chunks of inserted content, generating a second substream comprising the subset of the plurality of chunks of the first media stream and a second one or more additional chunks of inserted content, streaming the first substream to a first plurality of client devices via the first multicast address, and streaming the second substream to a second plurality of client devices via the second multicast address.

Generating the first substream may further comprise generating a first stream manifest identifying the first one or more additional chunks of inserted content.

Generating the first substream may further comprise replacing a second subset of the plurality of chunks of the first media stream with the first one or more additional chunks of inserted content.

Generating the second substream may further comprise replacing the second subset of the plurality of chunks of the first media stream with the second one or more additional chunks of inserted content.

Generating the first substream may further comprise selecting the first one or more additional chunks of inserted content according to a policy corresponding to a virtual zone identified by the first multicast address.

Streaming the first substream to the first plurality of client devices via the first multicast address may further comprise streaming the first substream to an intermediary device, the intermediary device performing quadrature amplitude modulation on the first substream to generate a modulated signal, and retransmitting the modulated signal to the first plurality of client devices.

Optional features of one aspect may be combined with any other aspect.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Conventional television distribution, whether over-the-air broadcast, satellite broadcast, or cable broadcast, is typically based on geographic regions, with recipient devices (e.g. televisions, set top boxes, etc.) in the same geographic region receiving the same content. This content may include primary programming as well as localized content, such as local news, weather, traffic, advertising, promotions, etc.

Figure 1A:
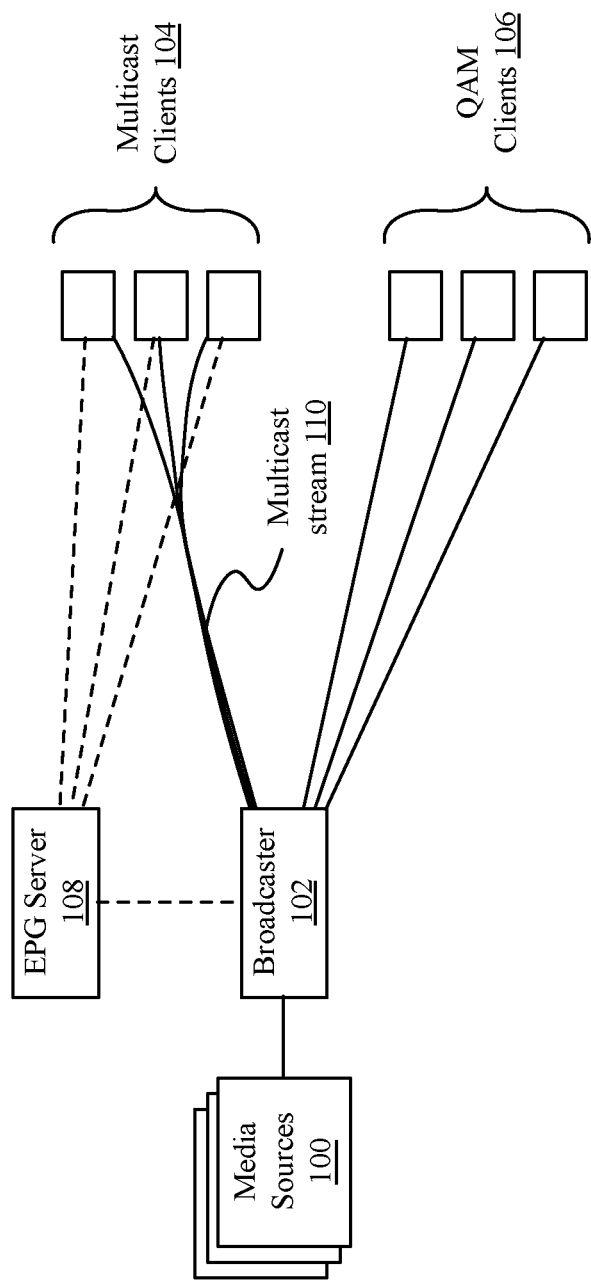
FIG. 1A is a block diagram of an implementation of a media broadcast environment.

For example, referring first to FIG. 1A, illustrated is a block diagram of an implementation of a media broadcast environment. A broadcaster 102, sometimes referred to as a broadcast distributor, a cable distributor, a satellite distributor, or a multichannel video programming distributor (MVPD), may receive media from one or more media sources 100, which may include television stations, television network providers, cable or premium channel providers, and/or local media sources (e.g. media playback servers, etc.). The broadcaster 102 may provide the media to a plurality of recipient devices, which may include multicast clients 104 and/or quadrature amplitude modulation (QAM) signal clients 106.

Multicast clients 104 may receive channels via multicast distribution or IPTV. Specifically, in many broadcast system implementations, broadcast media may be delivered via multicast internet protocol to set top boxes or televisions at viewer locations. A television or set top box (STB) may "tune" to a channel by receiving a multicast IP flow or stream 110, typically encapsulating HTTP live streaming (HLS) application layer protocol data over a lossy transport layer protocol (e.g. user datagram protocol or UDP). The IP address for the flow or stream 110 may be identified in an electronic program guide (EPG), retrieved by the multicast client 104 from an EPG server 108 (e.g. indicating that a first channel is at multicast address 230.0.0.1; a second channel is at multicast address 230.0.0.2, etc., or in corresponding IPv6 multicast addresses in other implementations such as). Conversely, QAM clients 106 may receive modulated signals (either analog or digitally encoded) with predetermined carrier frequencies, and may tune to the desired carrier frequency and demodulate and decode the received signal.

In many implementations, the same channel content may be provided to QAM clients 106 and multicast clients 104 for a corresponding channel. Additional localized content may be inserted into the channel stream, whether QAM or multicast IP, by the cable operator or broadcaster 102, such that every device tuning into the channel receives the same localized content. However, this typically results in high level geographic granularity, providing the same advertising to large regions or zones. Specifically, the physical topology of the distribution system—whether terrestrial broadcast to a region or cable broadcast through local nodes and taps to individual residences or businesses—may limit the ability of broadcasters to provide individualized programming.

Some attempts to provide individualized programming require modifications to recipient devices, such as custom programming for televisions or set top boxes. For example, in some implementations, a set top box may include a customized client agent that receives a network stream for primary programming (e.g. via multicast IP distribution), and pre-fetches additional media for local insertion, or switches to unicast media streams at predetermined breaks. While these systems may allow for individualized programming, they lack scalability (e.g. each client requires its own communication session with the content server, which may quickly become impractical with geographic regions including tens or hundreds of thousands of recipient devices, or even millions for major metropolitan areas). Additionally, each recipient device must be programmed with the client agent, requiring cooperation from large numbers of device manufacturers, including television manufacturers, set top box manufacturers, cable or satellite modem manufacturers, etc., with significant development resources required for design, implementation, testing, and support. This may also adversely impact product development cycles, as manufacturers who develop new smart televisions each year may not wish to devote resources to a product with a limited release time.

Instead, the systems and methods discussed herein provide for customized programming through "virtual zoning", not based on network architecture or geographic region, via a modified electronic programming guide (EPG) provided to devices assigned to virtual zones. Recipient devices may be provided with customized EPGs having multicast address metadata corresponding to the virtual zone (e.g. a first client device receives an EPG indicating that a given channel is at multicast address 230.0.0.1; while a second client device receives a second EPG indicating that the same channel is at multicast address 230.0.0.2). The broadcaster may generate copies of each broadcast channel including different advertisements, and provide the different copies via the corresponding multicast address.

Figure 1B:
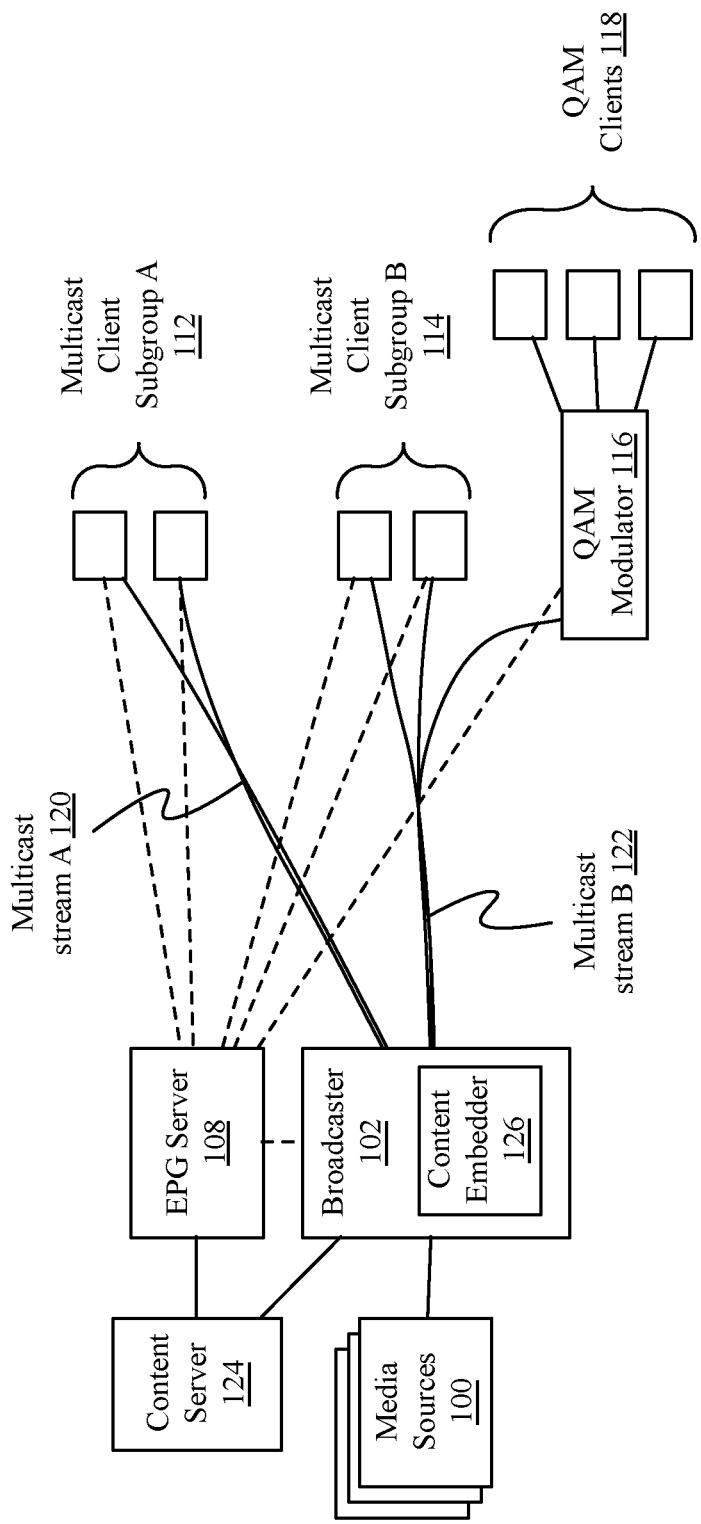
FIG. 1B is a block diagram of an implementation of a system for custom zoning for media broadcasting.

For example, referring to FIG. 1B, a broadcaster 102 may generate a plurality of multicast streams (e.g. 120, 122, referred to as localized streams or substreams) that may be provided to different subgroups of client devices (e.g. 112, 114). Each device may request an EPG from the EPG server 108, which may in some implementations identify the device and determine whether it should be a member of a subgroup or virtual zone. For example, the EPG server 108 may receive a request from a device for an EPG, the request including a device identifier (e.g. MAC address, serial number, account identifier, username, etc.) that uniquely identifies the device. The EPG server 108 (or another server in communication with the EPG server 108) may retrieve a profile associated with the device identifier, which may identify one or more characteristics of the device or a user associated with the device. The EPG server or other server may compare the characteristics identified in the device profile to one or more zone policies. The policies may include a set of required characteristics for the zone (e.g. location, device type, viewing history, or any other type and form of device or user characteristic). If the profile characteristics match the required characteristics for the virtual zone or policy, the device may be assigned to the corresponding subset. Responsive to the assignment, the EPG server 108 may respond to the request with a customized EPG for the subset (e.g. identifying the multicast address of the corresponding localized stream 120 or 122).

Advantageously, no changes need to be made to software on the client device, which can tune to the multicast address indicated in its received customized copy of the EPG normally. The client device is thus agnostic to any virtual zone, allowing easy implementation including on existing devices.

Furthermore, as shown in FIG. 1B, in some implementations, QAM client devices 118 may also receive a localized programming stream via the same mechanism, via an intermediary QAM modulator 116 that acts as another client device. The QAM modulator 116 may similarly request an EPG from EPG server 108 and may receive a localized EPG. The QAM modulator 116 may receive the corresponding multicast stream or streams, and decode, modulate, and retransmit the streams to QAM clients 118. This allows easy integration with legacy devices.

The solution is also highly scalable, increasing bandwidth only as a multiple of the number of virtual zones (e.g. twice the normal bandwidth for two zones, even if each includes thousands of subscriber devices), rather than requiring individual unicast streams for each STB or television (e.g. requiring thousands of streams for thousands of subscribers).

As shown, in some implementations, broadcaster 102 may communicate with a content server 124 to retrieve additional content for insertion into streams from media sources 100 via a content embedder 126. Content embedder 126 may include an application, server, service, daemon, routine, or other executable logic for inserting additional content into a media stream. For example, content embedder 126 may receive a content stream from a media source. In some implementations, the content stream may comprise an analog or digital video or audio stream, and the broadcaster 102 may transcode the stream for multicast IP transmission (e.g.

to an HTTP Live Streaming (HLS) protocol, a Dynamic Adaptive Streaming over HTTP (DASH) protocol, or any other appropriate streaming protocol). In other implementations, the content stream may be pre-encoded in HLS or DASH or another protocol. The encoded stream may comprise a plurality of media chunks which may be downloaded by a recipient device and decoded for playback. In some implementations, the content embedder 126 may insert additional chunks and/or replace existing chunks with new chunks for localized content. The content embedder 126 may rename chunks, generate and/or modify stream manifests, or perform other steps for inserting the localized content into a media stream.

Client devices 112, 114, 118 and intermediary modulator 116, referred to generally as client device(s), may comprise any type and form of media device or computing device, including a desktop computer, laptop computer, portable computer, tablet computer, wearable computer, embedded computer, smart television, set top box, console, Internet of Things (IoT) device or smart appliance, or any other type and form of computing device. Client device(s) may be referred to variously as a client, device, client device, computing device, user device, or any other such term. Client devices and intermediary modulator may receive media streams via any appropriate network, including local area networks (LANs), wide area networks (WANs) such as the Internet, satellite networks, cable networks, broadband networks, fiber optic networks, microwave networks, cellular networks, wireless networks, or any combination of these or other such networks. In many implementations, the networks may include a plurality of subnetworks which may be of the same or different types, and may include a plurality of additional devices (not illustrated), including gateways, modems, firewalls, routers, switches, etc.

In some implementations, a client device may execute an application, service, server, daemon, routine, or other executable logic for communicating over a network, such as a web browser, mail client, video player, music player, video game, or any other such application. Such applications may include a command line interface, graphical user interface, or any combination of these or other interfaces. In implementations in which a client device is a smart television or set top box, the client device may receive media streams via a first interface, such as a terrestrial, satellite, or cable broadcast; and may communicate with an EPG server via a second interface, such as an Ethernet or WiFi interface. In other implementations, a client device may receive content and EPGs via the same network. A client device may request content and may provide a device identifier, cookie, or other such identifier such that a content provider may select customized content for the corresponding device or a user of the device.

In many implementations, a client device may include a processor and a memory device. The memory device may store machine instructions that, when executed by the processor cause the processor to perform one or more of the operations described herein. The processor may include a microprocessor, ASIC, FPGA, etc., or combinations thereof. In many implementations, a processor may be a multi-core processor or an array of processors. A memory device may include, but is not limited to, electronic, optical, magnetic, or any other storage devices capable of providing a processor with program instructions. A memory device may include a floppy disk, CD-ROM, DVD, magnetic disk, memory chip, ROM, RAM, EEPROM, EPROM, flash memory, optical media, or any other suitable memory from which a processor can read instructions. The instructions may include code from any suitable computer programming language such as, but not limited to, C, C++, C #, Java, JavaScript, Perl, HTML, XML, Python and Visual Basic.

A client device may include one or more network interfaces. A network interface may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network. In many implementations, a client device may include a plurality of network interfaces of different types, allowing for connections to a variety of networks.

A client device may include one or more user interface devices. A user interface device may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of a client device, such as a built-in display, touch screen, microphone, etc., or external to the housing of a client device, such as a monitor connected to a client device, a speaker connected to a client device, etc., according to various implementations.

As discussed above, a client device may include or be identified with a device identifier. A device identifier may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier may be fixed to the device or preconfigured in the device, such as a manufacturer serial number or MAC address, while in other implementations, the device identifier may be dynamically set by a content provider, streaming server, application, or other entity, such as a cookie or username. In some implementations, a unique or new device identifier may be set for each communication to a content provider and/or EPG server, while in other implementations, the device identifier may not be changed, or may be changed periodically (e.g. hourly, daily, weekly, etc.) or at other intervals (e.g. on restart of the client device, login to an internet service, etc.). In some implementations, a device identifier may be associated with one or more other device identifiers (e.g., a device identifier for a mobile device, a device identifier for a home computer, etc.). In many implementations, a device identifier may be generated and/or transmitted to the device by a content provider. In other implementations, as discussed above, a client device may request a device identifier or cookie from an EPG server or content provider, and may transmit the device identifier or cookie to the EPG server or content provider in association with requests for content or customized EPGs.

Figure 1C:
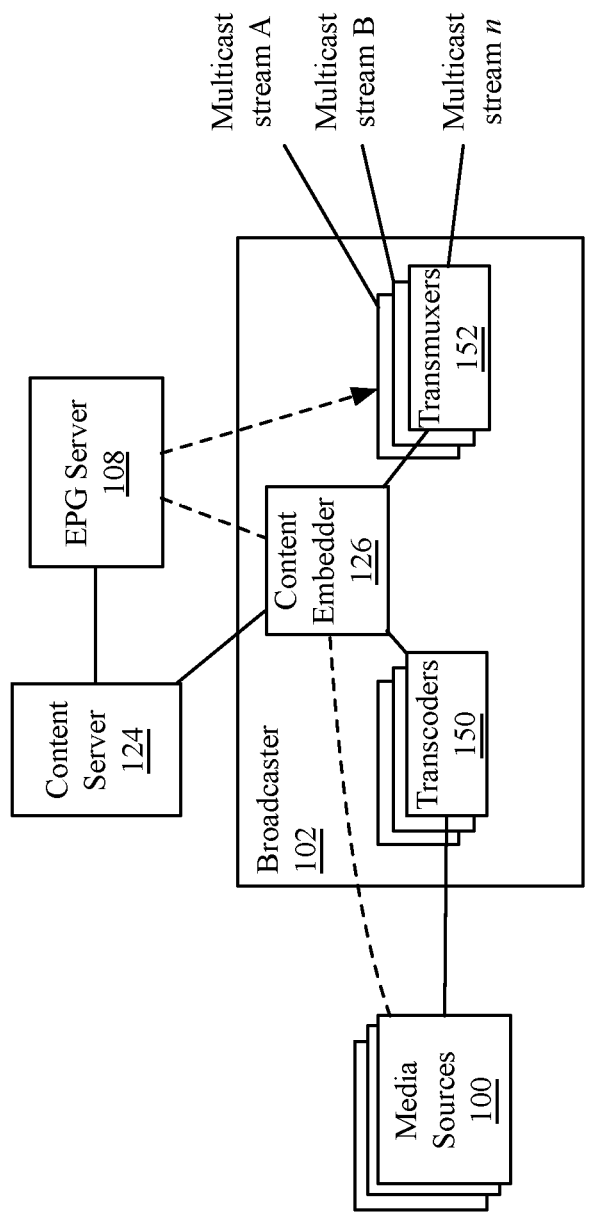
FIG. 1C is a block diagram of an implementation of a broadcast system for custom zoning for media broadcasting.

FIG. 1C illustrates additional details of an implementation of a broadcaster 102. Although shown as a single system, in many implementations, broadcaster 102 may comprise a plurality of interconnected systems, computing devices, processors, demodulators, media sources, recording or playback devices, or other such devices. Broadcaster 102 may include one or more transcoders 150 as discussed above for converting media sources that are not in a compatible streaming format (e.g. DASH, HLS, etc.) into a streaming protocol. In many implementations, a plurality of transcoders 150 may be used for a corresponding plurality of media sources 100. Streams that are already encoded in a compatible format may be provided directly to a content embedder 126 (e.g. dashed line).

Localized content may be provided by one or more content servers 124, or by additional media sources 100 (not illustrated) such as local television stations, playback servers, automation systems, etc. As discussed above, content embedder 126 may insert the localized content into a media stream by adding or replacing chunks of the media stream, modifying stream manifest data, etc.

Broadcaster 102 may also include one or more transmuxers 152 (e.g. one for each virtual zone, in some implementations). Transmuxers 152 may comprise processors or computing devices for transcoding and/or multiplexing media streams for transmission via a network, including synchronous or asynchronous networks. A transmuxer 152 may receive a media stream including localized content and may retransmit the stream as a multicast stream, performing any necessary repacketization, encapsulation (e.g. in a lossy transport layer format such as UDP), or other processing. In some implementations, a transmuxer may convert a media stream from a first encoding (e.g. HLS) to a second encoding (e.g. an MPEG multicast transport stream, sometimes referred to as an M2TS or MPEG2-TS stream). In some implementations, this may not require transcoding: a stream may be received from a media source in a chunked format such as HLS, but may be encoded in MPEG 2, for example, and the transmuxer may reassemble the chunks into an MPEG 2 transport stream. Transmuxers may also perform any encryption, compression, or other required processing for transmission.

As discussed above, the broadcaster 102 may provide multiple multicast streams including the same media source stream and different localized content. The media source stream may thus be copied into a plurality of streams, e.g. by transcoders 150 and/or content embedder 126, in various implementations.

Broadcasters may thus provide virtual zone-based "localized" programming to devices regardless of location. The virtual zone-based EPG may be functionally identical to conventional EPGs, and thus fully compatible with existing recipient devices, without requiring custom programming or manufacturer resources. Content may be broadcast to virtual zones via multicast IP streams, with primary content provided to a plurality of virtual zones and custom content provided on a stream-by-stream basis. The resulting system is highly scalable, requiring additional resources only based on the number of virtual zones (which may be numbered in the tens or hundreds, in many implementations) rather than the number of recipient devices (which may be numbered in the millions).

Figure 2A:
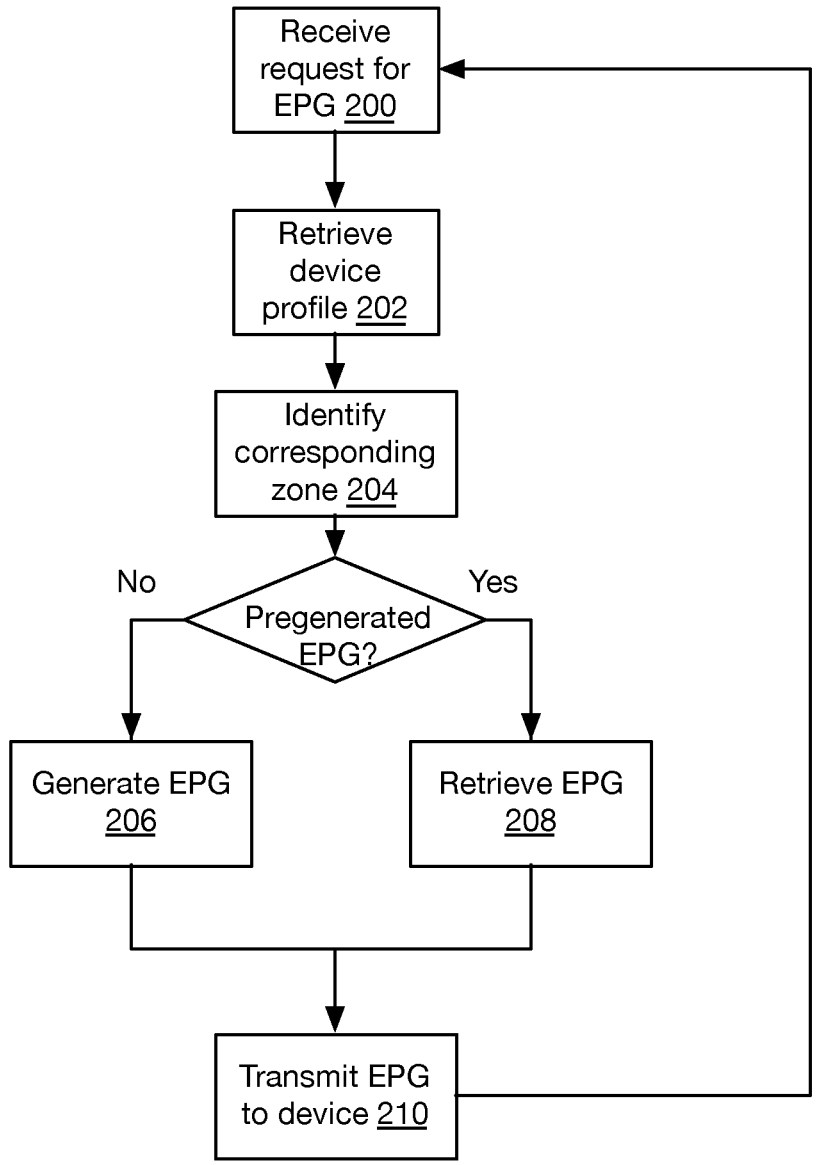
FIGS. 2A and 2B are flow charts illustrating implementations of methods for providing customized programming via virtual zones.

FIG. 2A is a flow chart illustrating an implementation of a method for providing customized EPGs for localized programming via virtual zones. At step 200, an EPG server may receive a request from a client device or a QAM modulating intermediary device for an EPG. The request may comprise a device identifier or other identifier of the device or a corresponding user.

At step 202, in some implementations, the EPG server may retrieve a device profile corresponding to the received identifier. The device profile may be stored in a database of the EPG server or retrieved from another server. At step 204, the device profile may be compared to one or more virtual zone policies; if the characteristics of the device profile match the requirements of the virtual zone policy, the device may be added to the corresponding virtual zone.

In some implementations, to increase security or privacy, the EPG server may not have access to the device profile; rather, the EPG server may provide the device identifier or an anonymized identifier (e.g. a cryptographic hash of the device identifier) to a database server or other server, which may retrieve the device profile and identify the corresponding virtual zone. The EPG server may, in such implementations, receive the identification of the corresponding virtual zone from said other server.

In some implementations, the EPG for the virtual zone may be pregenerated or have been previously generated (e.g. for another client device). In other implementations, the EPG may be regenerated dynamically for each request. Accordingly, at step 206 or 208, the EPG server may generate or retrieve the EPG for the virtual zone, and at step 210, may transmit the EPG to the requesting client device or intermediary device. As discussed above, the EPG may include identifications of one or more media channels or sources and corresponding multicast IP addresses for the virtual zone. The client device or intermediary device may "tune" to the channel or source and receive the localized media transport stream for the virtual zone, including inserted localized content. Other client devices or intermediary devices with other EPGs may receive the same channel or media source with different inserted localized content via other multicast addresses.

Figure 2B:
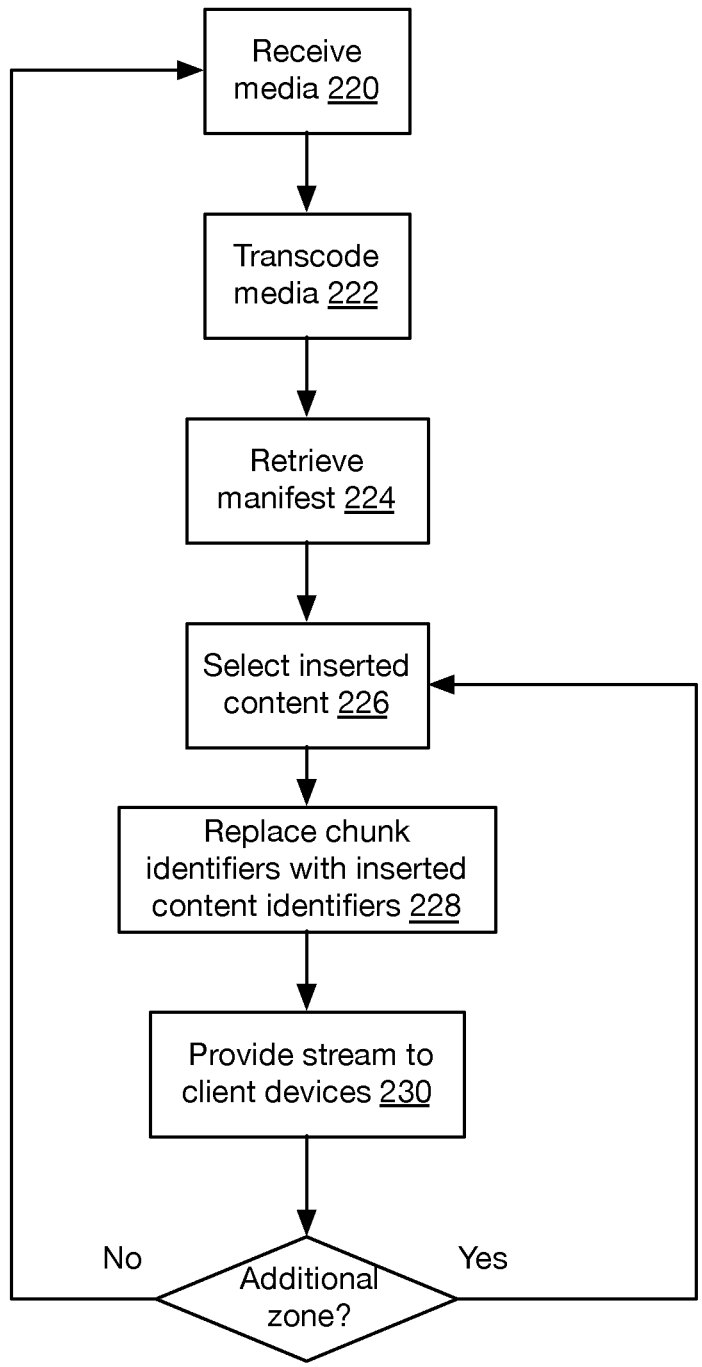

FIG. 2B is a flow chart illustrating an implementation of a method for providing customized programming via virtual zones. At step 220, a broadcaster or computing device of a broadcaster may receive a media stream from a media source. As discussed above, the media source may comprise any type and form of media source, including network sources (e.g. television stations or networks), media servers or storage servers, playback devices, broadcast studios, video switchers, or other such sources.

At step 222, in some implementations, the broadcaster may transcode the received media stream. In some implementations, the stream may be received in a first format, such as an MPEG 2 transport stream, and the broadcaster may convert the stream to a second format, such as a chunked protocol (e.g. HLS or DASH). In such implementations, transcoding may comprise packetizing and/or chunking the media, but may not require decoding and encoding of the media itself. In other implementations, the media stream may be received as an analog or digital broadcast signal, including AM, FM, or HD radio, NTSC or ATSC video, digital video, or any other type and form of signal, and the broadcaster may encode the signal in a chunked protocol format.

At step 220, in some implementations, the broadcaster may retrieve a stream manifest for the stream. In many implementations, the stream manifest may be delivered with the media stream or retrieved from the media source. In other implementations in which the broadcaster encodes a received signal, the broadcaster may generate a stream manifest for the chunked stream.

At step 226, the broadcaster may select content for insertion into a localized stream for a virtual zone, or may receive an identification of content for insertion from another device (e.g. a computing device of a producer, content publisher, or other such entity). At step 228, the selected content may be inserted into the localized stream and the manifest may be modified to refer to the inserted content (e.g. with chunk identifiers replaced).

At step 230, in some implementations, the stream may be reassembled or transcoded (e.g. via a transmuxer) and transmitted as a multicast stream to client devices of the virtual zone. As discussed above, in some implementations, the stream may be de-chunked or reassembled into a transport stream. The multicast stream may be transmitted with a multicast IP identified for the virtual zone in an EPG retrieved by the broadcaster from an EPG server.

As shown, steps 226-230 may be repeated for additional virtual zones. In many implementations, steps 226-230 may be performed simultaneously or in parallel for a plurality of zones (e.g. by a corresponding plurality of content embedders and/or transmuxers). Thus, a single media source may be localized and provided to client devices in a plurality of virtual zones, with each client device assigned to a virtual zone based on characteristics identified in a device profile.

Although discussed primarily in terms of video broadcasting, the systems and methods discussed herein may be utilized in any type of media distribution system utilizing IP multicast distribution. For example, the systems and methods may be used for audio distribution to a plurality of devices, such as home entertainment systems, smart home systems, smart radios, or other such devices. The devices may similarly receive an EPG and tune to an IP multicast comprising an encoded audio stream with embedded additional content. In a further implementation, the distributed media may be of heterogenous types. For example, a radio program may be multicast to smart home devices, with localized content such as local weather or traffic provided as images and/or video for presentation on a display of each device. Accordingly, as used herein, media may refer to any type and form of audio, video, image, text, or animated content or combinations thereof.

In one aspect, the present disclosure is directed to a method for multicast media delivery to virtual zones. The method includes receiving, by an electronic program guide (EPG) server, a plurality of requests for an EPG from a corresponding plurality of client devices. The method also includes identifying, by the EPG server, a first subset of the plurality of client devices as corresponding to a first virtual zone, and a second subset of the plurality of client devices as corresponding to a second virtual zone. The method also includes generating, by the EPG server, a first EPG corresponding to the first virtual zone comprising an identification of a first media stream and a first multicast address. The method also includes generating, by the EPG server, a second EPG corresponding to the second virtual zone comprising an identification of the first media stream and a second multicast address. The method also includes providing, by the EPG server, the first EPG to the first subset of the plurality of devices and the second EPG to the second subset of the plurality of devices.

In some implementations, the method includes identifying the first subset of the plurality of client devices as corresponding to a first virtual zone by, for each client device of the first subset: receiving a device identifier of said client device; retrieving a profile corresponding to the received device identifier; identifying a match between the retrieved profile and a policy corresponding to the first virtual zone; and responsive to identifying the match, adding said client device to the first virtual zone.

In some implementations, the retrieved profile comprises one or more characteristics and the policy corresponding to the first virtual zone comprises a set of predetermined values for the one or more characteristics. In some implementations, a first client device of the first subset and a second client device of the second subset are within a same geographic region. In some implementations, the method includes generating a stream manifest for the first media stream comprising an identification of a first item of inserted content. In a further implementation, the method includes generating a stream manifest for the second media stream comprising an identification of a second, different item of inserted content. In some implementations, a first device of the first subset of the plurality of devices receives the first media stream via the first multicast address, and a second device of the second subset of the plurality of devices receives the first media stream via the second multicast address.

In another aspect, the present disclosure is directed to a system for multicast media delivery to virtual zones. The system includes an electronic program guide (EPG) server in communication with a plurality of client devices. The EPG server is configured to receive a request for an EPG from each of the plurality of client devices. The EPG server is also configured to identify a first subset of the plurality of client devices as corresponding to a first virtual zone, and a second subset of the plurality of client devices as corresponding to a second virtual zone. The EPG server is also configured to generate a first EPG corresponding to the first virtual zone comprising an identification of a first media stream and a first multicast address. The EPG server is also configured to generate a second EPG corresponding to the second virtual zone comprising an identification of the first media stream and a second multicast address. The EPG server is also configured to provide the first EPG to the first subset of the plurality of devices and the second EPG to the second subset of the plurality of devices.

In some implementations, the EPG server is further configured to, for each client device of the first subset: receive a device identifier of said client device; retrieve a profile corresponding to the received device identifier; identify a match between the retrieved profile and a policy corresponding to the first virtual zone; and responsive to identifying the match, add said client device to the first virtual zone.

In some implementations, the retrieved profile comprises one or more characteristics and the policy corresponding to the first virtual zone comprises a set of predetermined values for the one or more characteristics. In some implementations, a first client device of the first subset and a second client device of the second subset are within a same geographic region. In some implementations, the EPG server is further configured to generate a stream manifest for the first media stream comprising an identification of a first item of inserted content. In a further implementation, the EPG server is further configured to generate a stream manifest for the second media stream comprising an identification of a second, different item of inserted content.

In some implementations, a first device of the first subset of the plurality of devices receives the first media stream via the first multicast address, and a second device of the second subset of the plurality of devices receives the first media stream via the second multicast address.

In another aspect, the present disclosure is directed to a method for multicast media delivery to virtual zones. The method includes receiving, from an electronic program guide (EPG) server by a streaming server, an identification of a first media stream, a first multicast address, and a second multicast address. The method also includes receiving, by the streaming server, a plurality of chunks of the first media stream. The method also includes generating a first substream comprising a subset of the plurality of chunks of the first media stream and a first one or more additional chunks of inserted content. The method also includes generating a second substream comprising the subset of the plurality of chunks of the first media stream and a second one or more additional chunks of inserted content. The method also includes streaming the first substream to a first plurality of client devices via the first multicast address. The method also includes streaming the second substream to a second plurality of client devices via the second multicast address.

In some implementations, the method includes generating the first sub stream by generating a first stream manifest identifying the first one or more additional chunks of inserted content. In some implementations, the method includes generating the first substream by replacing a second subset of the plurality of chunks of the first media stream with the first one or more additional chunks of inserted content. In a further implementation, the method includes generating the second substream by replacing the second subset of the plurality of chunks of the first media stream with the second one or more additional chunks of inserted content. In some implementations, the method includes generating the first substream by selecting the first one or more additional chunks of inserted content according to a policy corresponding to a virtual zone identified by the first multicast address. In some implementations, the method includes streaming the first substream to the first plurality of client devices via the first multicast address by streaming the first substream to an intermediary device, the intermediary device performing quadrature amplitude modulation on the first substream to generate a modulated signal, and retransmitting the modulated signal to the first plurality of client devices.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed:

1. A method for multicast media delivery to virtual zones, comprising:
   receiving, by an electronic program guide (EPG) server, a plurality of requests for an EPG from a corresponding plurality of client devices;
   identifying, by the EPG server, a first subset of the plurality of client devices as corresponding to a first virtual zone, the first virtual zone associated with a first characteristic, and a second subset of the plurality of client devices as corresponding to a second virtual zone, the second virtual zone associated with a second characteristic;
   generating, by the EPG server, a first EPG corresponding to the first virtual zone comprising: an indication of how to tune to a channel of the first EPG, the indication of how to tune to the channel of the first EPG including an identification of a single first multicast address corresponding to a single first multicast substream generated by inserting a first set of one or more additional chunks of inserted content into a first media stream, wherein generating the first EPG further comprises generating a stream manifest for the first multicast substream comprising an identification of the first set of one or more additional chunks of inserted content;
   generating, by the EPG server, a second EPG corresponding to the second virtual zone comprising: an indication of how to tune to the same channel of the second EPG, the indication of how to tune to the same channel of the second EPG including an identification of a single second multicast address corresponding to a single second multicast substream generated by inserting a second set of one or more additional chunks of inserted content into the first media stream, wherein the first set of one or more additional chunks of inserted content are distinct from the second set of one or more additional chunks of inserted content; and
   providing, by the EPG server, the first EPG to the first subset of the plurality of devices and the second EPG to the second subset of the plurality of devices.

2. The method of claim 1, wherein identifying the first subset of the plurality of client devices as corresponding to the first virtual zone further comprises, for each client device of the first subset:
  receiving a device identifier of said client device;
  retrieving a profile corresponding to the received device identifier, the profile associated with a third characteristic;
  identifying a match between the third characteristic associated with the retrieved profile and the first characteristic associated with the first virtual zone; and
  responsive to identifying the match, adding said client device to the first virtual zone.

3. The method of claim 2, wherein the first characteristic comprises a first predetermined value and the third characteristic comprises a second predetermined value.

4. The method of claim 1, wherein the first virtual zone is associated with a first policy, the first policy comprising the first characteristic, and the second virtual zone is associated with a second policy, the second policy comprising the second characteristic.

5. The method of claim 1, wherein a first client device of the first subset and a second client device of the second subset are within a same geographic region.

6. The method of claim 1, wherein generating the second EPG further comprises generating a stream manifest for the second multicast substream comprising an identification of a second, different item of inserted content.

7. The method of claim 1, wherein a first device of the first subset of the plurality of devices receives the first multicast substream via the first multicast address, and wherein a second device of the second subset of the plurality of devices receives the second multicast substream via the second multicast address.

8. A method for multicast media delivery to virtual zones, comprising:
  receiving, from an electronic program guide (EPG) server by a streaming server, an identification of a first media stream, a single first multicast address corresponding to a channel of a first EPG for a first virtual zone, and a single second multicast address corresponding to the same channel of a second EPG for a second virtual zone;
  receiving, by the streaming server, a first media stream;
  generating, by the streaming server, a single first multicast substream corresponding to the channel of the first EPG by inserting a first set of one or more additional chunks of inserted content into the first media stream, wherein generating the first multicast substream further comprises generating a first stream manifest identifying the first set of one or more additional chunks of inserted content;
  generating, by the streaming server, a single second multicast substream corresponding to the same channel of the second EPG by inserting a second set of one or more additional chunks of inserted content into the first media stream, wherein the first set of one or more additional chunks of inserted content are distinct from the second set of one or more additional chunks of inserted content;
  streaming, by the streaming server, the single first multicast substream to a first plurality of client devices via the single first multicast address corresponding to the channel of the first EPG for the first virtual zone identified by the EPG server, the first virtual zone associated with a first characteristic; and
  streaming, by the streaming server, the single second multicast substream to a second plurality of client devices via the single second multicast address corresponding to the same channel of the second EPG for the second virtual zone identified by the EPG server, the second virtual zone associated with a second characteristic.

9. The method of claim 8, wherein generating the first multicast substream further comprises replacing a plurality of chunks of the first media stream with the first set of one or more additional chunks of inserted content.

10. The method of claim 8, wherein generating the second multicast substream further comprises replacing a plurality of chunks of the first media stream with the second set of one or more additional chunks of inserted content.

11. The method of claim 8, wherein generating the first multicast substream further comprises selecting the first set of one or more additional chunks of inserted content according to a first policy corresponding to the first virtual zone identified by the first multicast address, the first policy comprising the first characteristic.

12. The method of claim 8, wherein streaming the first multicast substream to the first plurality of client devices via the first multicast address further comprises streaming the first multicast substream to an intermediary device, the intermediary device performing quadrature amplitude modulation on the first multicast substream to generate a modulated signal, and retransmitting the modulated signal to the first plurality of client devices.

13. A system for multicast media delivery to virtual zones, comprising:
  a data processing system comprising one or more processors, and a network interface in communication with a client computing device;
  wherein the one or more processors are configured to:
  receive a plurality of requests for an EPG from a corresponding plurality of client devices;
  identify a first subset of the plurality of client devices as corresponding to a first virtual zone, the first virtual zone associated with a first characteristic, and a second subset of the plurality of client devices as corresponding to a second virtual zone, the second virtual zone associated with a second characteristic;
  generate a first EPG corresponding to the first virtual zone comprising: an indication of how to tune to a channel of the first EPG, the indication of how to tune to the channel of the first EPG including an identification of a single first multicast address corresponding to a single first multicast substream generated by inserting a first set of one or more additional chunks of inserted content into a first media stream, wherein generating the first EPG further comprises generating a stream manifest for the first multicast substream comprising an identification of the first set of one or more additional chunks of inserted content;
  generate a second EPG corresponding to the second virtual zone comprising: an indication of how to tune to the same channel of the second EPG, the indication of how to tune to the same channel of the second EPG including an identification of a single second multicast address corresponding to a single second multicast substream generated by inserting a second set of one or more additional chunks of inserted content into the first media stream, wherein the first set of one or more additional chunks of inserted content are distinct from the second set of one or more additional chunks of inserted content; and provide the first EPG to the first subset of the plurality of devices and the second EPG to the second subset of the plurality of devices.

14. The system of claim 13, wherein to identify the first subset of the plurality of client devices as corresponding to the first virtual zone for each client device of the first subset, the data processing system is configured to:
- receive a device identifier of said client device;
- retrieve a profile corresponding to the received device identifier, the profile associated with a third characteristic;
- identify a match between the third characteristic associated with the retrieved profile and the first characteristic associated with the first virtual zone; and
- responsive to identifying the match, add said client device to the first virtual zone.

15. The system of claim 14, wherein the first characteristic comprises a first predetermined value and the third characteristic comprises a second predetermined value.

16. The system of claim 13, wherein the first virtual zone is associated with a first policy, the first policy comprising the first characteristic, wherein the second virtual zone is associated with a second policy, the second policy comprising the second characteristic, and wherein a first client device of the first subset and a second client device of the second subset are within a same geographic region.

17. The system of claim 13, wherein generating the first EPG further comprises generating a stream manifest for the first multicast substream comprising an identification of a first item of inserted content, and wherein generating the second EPG further comprises generating a stream manifest for the second multicast substream comprising an identification of a second, different item of inserted content.

18. The system of claim 13, wherein a first device of the first subset of the plurality of devices receives the first multicast substream via the first multicast address, and wherein a second device of the second subset of the plurality of devices receives the second multicast substream via the second multicast address.

* * * * *